UNITED STATES PATENT OFFICE.

RENÉ BOHN, OF LUDWIGSHAFEN-ON-THE-RHINE, BAVARIA, ASSIGNOR TO THE BADISCHE ANILIN AND SODA FABRIK, OF MANNHEIM, GERMANY.

ALIZARINE-GREEN.

SPECIFICATION forming part of Letters Patent No. 399,479, dated March 12, 1889.

Application filed October 18, 1888. Serial No. 288,429. (Specimens.)

*To all whom it may concern:*

Be it known that I, RENÉ BOHN, a citizen of Switzerland, residing at Ludwigshafen-on-the-Rhine, in the Kingdom of Bavaria and Empire of Germany, have invented new and useful Improvements in the Manufacture of Alizarine-Green, of which the following is a specification.

My invention relates to the manufacture of an improved dye-stuff or coloring-matter, produced by the successive action of sulphuric anhydride and of sulphuric acid upon alizarine-blue, the action of the latter acid being assisted by an elevated temperature.

In carrying out my invention about ten parts, by weight, of perfectly dry and finely-powdered alizarine-blue are added, in very small portions at a time, to about one hundred parts, by weight, of fuming sulphuric acid containing about seventy per cent. of free anhydride. Throughout this operation the mixture is to be kept agitated, and every rise of temperature ought to be carefully prevented by the application of external cooling. After the entire amount of alizarine-blue has thus been added—an operation which requires, generally, about eight hours's time—the mixture or solution is to be agitated during the space of another five or six hours at a temperature of about 50° centigrade, in order to complete the conversion of alizarine-blue into its new derivative, and then, without separating the intermediate product thus formed, about two hundred parts, by weight, of concentrated or rectified sulphuric acid of about 1.84 specific gravity are added, and the temperature of the solution is gradually raised to about from 120° centigrade to about 125° centigrade. After maintaining the temperature at the said range for about eight hours, the result of the operation is poured into water, and the precipitate of alizarine-green thus obtained, after being heated up with the acid solution to about 100° centigrade, and then being allowed to cool down to about 40° centigrade, is filtered, washed, and pressed.

Alizarine-green prepared as above described presents the following characteristic properties: In its free or uncombined state it appears under the form of fine bluish-gray needle-shaped crystals, which are insoluble in cold water and possess only a slight degree of solubility in boiling water and in alkaline solutions. Alizarine-green forms blue saline compounds with alkaline carbonates and green compounds upon being mixed with caustic potash or soda liquor in excess. The said compounds or salts of alizarine-green are quite insoluble in excess of caustic-alkaline solutions. It combines with the bisulphites of potash, soda, or ammonia, forming soluble compounds analogous to those of alizarine-blue and capable of being used in an analogous manner in dyeing and printing with the aid of appropriate mordants. Alizarine-green can likewise be employed as a dye-stuff or coloring-matter in a similar manner as alizarine-blue.

The shades produced by alizarine-green are very fast, and are distinguished from the corresponding shades of alizarine-blue, principally from those obtained with the aid of chrome mordants, by their tint more or less approaching a green.

What I claim as new, and desire to secure by Letters Patent, is—

As a new product, the coloring-matter or dye-stuff (alizarine-green) hereinbefore described, and having the following characteristics: In its free or uncombined state it appears under the form of fine bluish-gray needle-shaped crystals which are insoluble in cold water and possess only a slight degree of solubility in boiling water and in alkaline solutions; it forms blue saline compounds with alkaline carbonates and green compounds upon being mixed with caustic potash or soda liquor in excess, the compounds thus formed being quite insoluble in excess of caustic-alkaline solutions, and it produces soluble compounds with the bisulphites of potash, soda, or ammonia, which, with the aid of chrome mordants, produce shades more or less approaching a green.

In testimony whereof I have hereunto set my hand in the presence of two subscribing witnesses.

RENÉ BOHN.

Witnesses:
AUGUST HANSE,
JOHANNES BÜTTNER.